(12) United States Patent
Miyamoto et al.

(10) Patent No.: US 6,601,011 B1
(45) Date of Patent: Jul. 29, 2003

(54) APPARATUS FOR MEASURING ANGULAR VELOCITY VARIATION RATE OF ROTARY AXLE

(75) Inventors: Teruo Miyamoto, Saitama (JP); Yorikatsu Suzuki, Yokohama (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 09/513,220

(22) Filed: Feb. 25, 2000

(30) Foreign Application Priority Data

Feb. 26, 1999 (JP) .......................................... 11-050933

(51) Int. Cl.7 ............................................. G06F 15/00
(52) U.S. Cl. ...................... 702/147; 702/150; 702/146; 702/145; 73/510
(58) Field of Search ................................. 702/141, 142, 702/145, 150, 151, 147, 146; 73/510, 514.39, 862.09

(56) References Cited

U.S. PATENT DOCUMENTS 4,989,458 A   2/1991   Suzuki ..................... 73/862.09

FOREIGN PATENT DOCUMENTS

| JP | 4-331370 | 11/1992 |
| JP | 5-322924 | 12/1993 |

OTHER PUBLICATIONS

Suzuki, Y. "Further Advancement of Chassis–dynamometer Measurement and Control Technology," *A Japanese Paper of Society of Automotive Engineering*, No. 9831116 in vol. 53 and No. 3 (Mar. 1999).

*Primary Examiner*—John Barlow
*Assistant Examiner*—Stephen J. Cherry
(74) *Attorney, Agent, or Firm*—Foley & Lardner

(57) ABSTRACT

In an apparatus for measuring an angular velocity variation rate of a rotary axle, an approximately circular disc shaped plate is attached approximately concentrically around the rotary axle, in addition to a first pair of velocity pulse generators, each velocity pulse generator of the first pair being dispose around pulse circumference of the plate on a first virtual line passing through a center of the rotatory axle with one of the velocity pulse generators positioned in an 180° revolution difference with respect to each other, each velocity pulse generator of a second pair being disposed around the circumference of the plate on a second virtual line passing through the center of the rotary axle and being inclined through an angle of 180°/m to the first virtual line set when a variation in the angular velocity variation rate indicate signal occurs m-th number of times per revolution of the rotatory axle.

14 Claims, 6 Drawing Sheets

APPARATUS FOR MEASURING ANGULAR VELOCITY VARIATION RATE OF ROTARY AXLE

BACKGROUND OF THE INVENTION

1. Field of the Invention

The present invention relates to apparatus for measuring an angular velocity variation rate (viz., angular acceleration) of a rotary axle applicable to, for example, an apparatus for detecting a torque of an oscillation-type chassis dynamometer and applicable to cases where an electric inertia simulation is carried out without use of a mechanical variable inertia device and where velocity fluctuations are suppressed in an electric motor having many load variations.

2. Description of the Related Art

An angular velocity variation rate (i.e. angular acceleration or deceleration) is an important control parameter when electric inertia control is carried out in a chassis dynamometer.

Japanese Patent Application First Publication No. Heisei 5-322,924 published on Dec. 7, 1993 (now Japanese Patent No. 2,500,565) exemplifies an analog-type angular velocity variation rate measuring apparatus.

In the analog-type angular velocity variation rate measuring apparatus disclosed in the above-described Japanese Patent First Publication, a pair of pulse pick-ups are disposed concentrically around an inductor attached onto the rotary axle on a virtual line passing a center of the rotary axle with one of the pulse (magnetic) pick-ups disposed in a positional phase difference of 180° to the other. A frequency (a repetition rate) of a revolution velocity pulse train proportional to a revolution velocity of the rotary axle generated by means of each pulse pick-up, is then converted into an analog velocity indicative signal to derive an average value by means of a frequency-to-voltage converter. Each analog velocity indicative signal is averaged and the averaged analog velocity indicative signal is differentiated by means of a differentiator to provide an angular velocity variation rate indicative signal. Since the pair of the pulse pickups are disposed around the inductor at a pulse interval of 180°, a measurement error due to an eccentricity of the inductor to the rotary axle can be cancelled.

SUMMARY OF THE INVENTION

However, in the frequency-to-voltage converter used in the analog angular velocity variation rate measuring apparatus, the linearity of the conversion of the frequency to the voltage is reduced in a relatively low frequency range.

In addition, in an electrical inertia control such as carried out in the chassis dynamometer, a rated angular acceleration measurement range is extremely small and a zero point stability is degraded. For example, in a chassis dynamometer having rollers each roller having a diameter on which vehicular road wheels are mounted, a normal rated velocity is about 160 Km/h (=44.4 m/s and the roller revolution speed is $11.67s^{-1}$) and a rated angular velocity variation rate measurement range is about $\pm 5$ m/s$^2$.

That is to say, it takes eight seconds or longer to accelerate the roller up to the rated velocity.

A differentiator, provided in the above-described analog type velocity variation rate measuring apparatus, to calculate the angular acceleration from the angular velocity is constituted by a first capacitor interposed between an angular velocity input and a first resistor, a second resistor connected across a first operational amplifier, a second capacitor connected across the first operational amplifier, a third resistor, a variable resistor connected to the first operational amplifier, and a second operational amplifier across which the variable resistor is connected and which outputs the angular velocity variation rate. If a differentiation time is obtained within a time on the basis of which the above-described velocity variation rate is derived, the first capacitor indicates approximately 4 $\mu$F and the first resistor indicates approximately 250 kilo-ohms.

Although the measurement accuracy is reduced if a film capacitor having a small leakage resistance is not used as the first capacitor, an actual mounting limit of 4 $\mu$F is present in terms of dimension of the first capacitor. If the angular velocity signal voltage inputted into the differentiator is 10 V at 160 Km/h, a voltage variation rate at the differentiator indicates $\pm 1.2$ V/s. An input current to the differentiator is $1.2 \times 4 \times 10^{-6}$=about 0.005 mA. This current value is relatively small as compared with about 0, 2 mA which is the input current at the rated velocity to prevent a variation due to a temperature variation and an external noise interference in a normally available analog controller. Consequently, a stability at a zero point becomes worsened.

The differentiator requires insertions of the second capacitor and the second resistor in order to prevent the detrimental effect of external noise and to prevent self oscillation from occurring.

Consequently, the response rate is degraded. An experimental result indicated that a maximum limit of 30 ms was placed at a response time percentage of 63%.

The analog-type angular velocity variation rate measuring apparatus described above under the heading of "related art" suffers from a number of drawbacks. In order to improve the measuring accuracy of the angular velocity variation rate with the above-described problems eliminated, a digital type angular velocity variation rate measuring apparatus has been proposed.

This previously proposed digital angular acceleration (angular velocity variation rate) measuring apparatus includes: an inductor of a toothed gear type attached concentrically onto the rotary axle; the pair of same pulse pick-ups whose disposed positions are the same as described in the case of the analog type velocity variation rate measuring apparatus; a pair of pulse shapers, each shaper shaping the corresponding velocity pulse signal from the corresponding pick-up of the first pair; a pair of velocity pulse counters counting the shaped velocity pulse signal from the pair of pulse shapers; a pair of period measuring counters, each period measuring counter receiving a velocity pulse from the corresponding pulse pick-up to count the velocity pulse signal; a memory to store a result of measurement corresponding to a predetermined number of times upon a receipt of the velocity pulse counters and the period measuring counters; an angular velocity calculator to calculate an average angular velocity upon receipt of the output of the memory; a controller to control the memory and the angular velocity calculator; a pair of digital-to-analog converters to convert the angular velocity and the angular acceleration calculated into digital signal. The digital-to-analog converter converts the angular velocity and the angular velocity variation rate into the digital signal. A first angular velocity variation rate calculating section is constituted by each circuit subsequent to the pair of pulse shapers.

As described above, each pulse pick-up generates magnetically the velocity pulse in synchronization with a revolution of the inductor. After the velocity pulse is shaped by means of the pair of pulse shapers, the number of velocity pulses is counted by means of each velocity pulse counter and is stored into an output register storing the accumulated number of velocity pulses.

Whenever the velocity pulses are inputted, the contents of the output register are updated. Each period measuring counts the number of clock pulses and is stored into the output register storing the number of accumulated clock pulses. Whenever the velocity pulse is inputted, the count of the output register is updated.

The controller, whenever the period measuring clock is inputted, issues a read command to the memory to store a latest measurement value stored into each output register of the corresponding counter, viz., the accumulated clock pulse number. Thereafter, the controller issues a calculation command to the angular velocity calculating section to read the latest accumulated velocity pulse number from the memory. The controller, thus, calculates the latest average angular velocity from the previously measured corresponding data, outputs the latest average angular velocity from the previously measured corresponding data and outputs it to the digital-to-analog converter, the average angular velocity being accumulatively stored into the memory. Thereafter, a calculation end signal is outputted to the angular velocity variation rate calculating section.

The angular velocity variation rate calculating section receives the calculation end signal to the latest accumulated check pulses and the average angular velocity from the memory.

The angular acceleration is calculated from this data and from the corresponding data before the number of times of measurement n settable arbitrarily and is outputted to the digital-to-analog converter converts the digital value to the analog value so as to output the digital angular velocity signal and the angular velocity variation rate signal.

Since, in the previously proposed digital angular velocity variation rate measuring apparatus described above, analog circuits such as the frequency-to-voltage converter are not used, a reduction of the linearity characteristic in the relatively low frequency region, an instability characteristic at zero point, and a slowing of the response rate can be prevented. In addition, since the angular velocity variation rate is derived from an inversion of the period of the velocity pulse train signal, an extremely small velocity measurement resolution can be obtained even at a short measuring period. The measurement period of the previously proposed digital angular velocity rate measuring apparatus is 1 ms. A method for starting the counting of the period measuring counter upon the receipt of the velocity pulse has been adopted in recently available inverter units.

Some recently available inverter units are adapted to set the measuring period of the digital angular velocity as short as approximately 1 ms. An external disturbance torque observer control using difference of the measured value (differential value) on the high-speed measuring period is carried out in these recently available inverter units. However, sufficient angular acceleration resolution cannot be obtained from the differential value described above and either a moving average or a filter process is therefore required.

In a simple angular velocity variation rate measuring system in which the number of velocity pulse inputted within a measurement period are counted and the counted number of the velocity pulses are multiplied by a certain coefficient, the number of velocity pulses inputted within the period of 10 milliseconds exceed slightly 100 even if the number of output pulses per revolution of the rotary axle are set to 10,000 or more. Hence, the angular velocity measuring apparatus is inappropriate for the angular velocity variation rate measurement.

In addition to the pair of pulse pick-ups and inductor, the pair of velocity pulse generators includes a pair of optical rotary encoders, the disc shaped plate (viz., the encoder main body) being attached onto the rotary axle. The rotary encoder includes disc shaped plate on a circumference of which a plurality of equally spaced slits are arranged, the disc shaped plate being attached on the rotary axle, and a pair of photo couplers, one of the photo couplers being disposed in an approximately 180° phase difference with the other.

A special assembly part in which the pair of photo couplers are built is used. However, the presence of an inherent eccentricity of a peripheral wall of the slit plate attached around the rotary axle due to a manufacturing accuracy has a detrimental effect on the measured result of the velocity variation rate or angular acceleration. Consequently, one variation in the measured revolution variation rate per revolution of the rotary axle occurs.

It was determined that the variation in the velocity variation rate occurs due to a pitch error in the gear portion of the inductor as a result of a performance verification carried out for a sample of the previously proposed digital angular velocity variation rate measuring apparatus including the inductor, the pair of velocity pulse generators and the first angular velocity variation rate calculating section.

Since the analog differentiator is operated under an extremely high amplification factor, an anti-oscillation amplification capacitor to prevent a self-oscillation needs to be inserted into a feedback loop in the differentiator. This insertion of the oscillation-preventing capacitor reduces the response frequency. On the other hand, the digital angular velocity variation rate calculating section has a possibility of obtaining the response frequency as several times as the analog differentiator. However, it is necessary to reduce the response frequency due to a presence of the pitch error on the gear position of the inductor. It is noted that the pitch error is an error present in a pitch diameter of such a toothed gear type inductor as described above.

It was determined from various experiments that the pitch error occurs with an optical slit plate, such as that used in an optical rotary encoder, as well as with toothed gear type inductors. It was also determined that the output variation in the angular velocity variation rate occurred by an odd number of times per revolution. For example, when the toothed gear type inductor was used as the component of the pulse generator pair in a full electric inertia control chassis dynamometer, the output variation of the angular velocity variation rate or angular acceleration (dv/dt) occurred four times per revolution period. As a result, the angular velocity variation rate (dv/dt) was indicated by a roller peripheral velocity variation rate in m/s$^2$ which is multiple of the angular acceleration (rad/s$^2$) of a roller radius (m).

In the case of the optical rotary encoder, the output variation of the angular velocity variation rate occurred either two or six times per revolution.

In addition, a variation waveform of the angular velocity variation rate was sinusoidal and a main frequency component of the variation waveform was 29.17 Hz when the roller peripheral velocity was 100 km/h, the roller revolution was 7.292s$^{-1}$ (x4=29.19s$^{-1}$).

The number of times by which the waveform variation occurrence is proportional to a square of the revolution velocity (or angular velocity) in the same way as the variation due to the eccentricity of the inductor.

In the case of the use of the toothed gear type inductor, it was empirically determined that the number of times the variation in the angular velocity variation rate occurred was reproducible if a working facility were the same and dimension and the number of tooth were also the same.

When the optical rotary encoder is used, the slit plate is manufactured with a photo-resist sensor (a pair of photo couplers). Hence, if the same structure, the same manufacturing form, and the same number of generated pulse number were produced, the number of variations in the velocity variation rate is reproducible.

It is, therefore, an object of the present invention to provide an improved apparatus for measuring the angular velocity variation rate of the rotary axle with a high accuracy which can suppress the output variation in the angular velocity variation rate due to at least the eccentricity of the toothed gear type inductor, the optical slit plate the pitch error in the toothed gear portion or in the slit portion of the slit plate.

According to one aspect of the present invention, there is provided with an apparatus for measuring an angular velocity variation rate of a rotary axle, comprising: an approximately circular disc shaped plate attached approximately concentrically around the rotary axle, the approximately circular disc shaped plate including a plurality of approximately equally spaced apart projections on a circumference thereof; a first pair of velocity pulse generators, each velocity pulse generator of the first pair being disposed around the circumference of the plate on a first virtual line passing through a center of the rotary axle with one of the velocity pulse generators positioned at a 180° revolution difference with respect to the other and generating a corresponding one of first and second velocity pulse signals in synchronization with a revolution of the plate; a first couple of angular velocity measuring sections that measure an angular velocity of the rotary axle from the corresponding one of first and second velocity pulse signals outputted by the first pair of the velocity pulse generators and outputs first and second angular velocity indicative signals each one indicating the measured angular velocity of the rotary axle independently of the other; a first average angular velocity measuring section that calculates an average value of the first and second angular velocity indicative signals outputted by the first couple of angular velocity measuring sections and outputs a first averaged angular velocity indicative signal indicating the average value of the first and second angular velocity indicative signals; a second pair of velocity pulse generators, each velocity pulse generator of the second pair being disposed around the circumference of the plate on a second virtual line passing through the center of the rotary axle at an angle of 180°/m to the first virtual line when a variation in the angular velocity variation rate indicative signal occurs m-th number of times per revolution of the rotary axle and generating a corresponding one of third and fourth velocity pulse signals in synchronization with the revolution of the plate; a second couple of angular velocity measuring sections that measure the angular velocity of the rotary axle from the corresponding one of third and fourth velocity pulse signals outputted by the second pair of the velocity pulse generators and output third and fourth angular velocity indicative signals each one indicating the measured angular velocity of the rotary axle independently of the other; a second average angular velocity measuring section that calculates an average value of the third and fourth angular velocity indicative signals outputted by the second couple of angular velocity measuring sections and outputs a second averaged angular velocity indicative signal indicating the average value of the third and fourth angular velocity indicative signals; and a differentiating section that differentiates a signal based on at least one of the first and second averaged angular velocity indicative signals outputted by the first and second average angular velocity measuring sections to output the angular velocity variation rate indicative signal.

According to another aspect of the present invention, there is provided with an apparatus for measuring an angular velocity variation rate of a rotary axle, comprising: an approximately circular disc shaped plate attached approximately concentrically around the rotary axle, the approximately circular disc shaped plate including a plurality of approximately equally spaced apart projections on a circumference thereof; a first pair of velocity pulse generators, each velocity pulse generator of the first pair being disposed around the circumference of the plate on a first virtual line passing through a center of the rotary axle with one of the velocity pulse generators positioned in a 180° rotational difference with respect to the other and generating a corresponding one of first and second velocity pulse signals in synchronization with a revolution of the plate; a first couple of angular velocity measuring sections that measure an angular velocity of the rotary axle from the corresponding one of first and second velocity pulse signals outputted by the first pair of the velocity pulse generators and outputs first and second angular velocity indicative signals each one indicating the measured angular velocity of the rotary axle independently of the other; a first average angular velocity measuring section that calculates an average value of the first and second angular velocity indicative signals outputted by the first couple of angular velocity measuring sections and outputs a first averaged angular velocity indicative signal indicating the average value of the first and second angular velocity indicative signals; a second pair of velocity pulse generators, each velocity pulse generator of the second pair being disposed around the circumference of the plate on a second virtual line passing through the center of the rotary axle and being inclined at an angle of 180°/m to the first virtual line set when a variation in the angular velocity variation rate indicative signal occurs m-th number of times per revolution of the rotary axle and generating a corresponding one of third and fourth velocity pulse signals in synchronization with the revolution of the plate; a second couple of angular velocity measuring sections that measure the angular velocity of the rotary axle from the corresponding one of third and fourth velocity pulse signals outputted by the second pair of the velocity pulse generators and output third and fourth angular velocity indicative signals each one indicating the measured angular velocity of the rotary axle independently of the other; a second average angular velocity measuring section that calculates an average value of the third and fourth angular velocity indicative signals outputted by the second couple of angular velocity measuring sections and outputs a second averaged angular velocity indicative signal indicating the average value of the third and fourth angular velocity indicative signals; a first differentiator that differentiates the first averaged velocity indicative signal to output a first angular velocity variation rate indicative signal; a second differentiator that differentiates the second averaged velocity indicative signal to output a second angular velocity variation rate indicative signal; and an average value calculator that calculates an average value of the first and second averaged angular velocity variation rate indicative signals to output the angular velocity variation rate indicative signal.

According to a still another object of the present invention, there is provided with An apparatus for measuring an angular velocity variation rate of a rotary axle, comprising: an approximately circular disc shaped plate attached approximately concentrically around the rotary axle, the approximately circular disc shaped plate including a plurality of approximately equally spaced apart projections on a circumference thereof; a first pair of velocity pulse generators, each velocity pulse generator of the first pair being disposed around the circumference of the plate on a virtual line passing through a center of the rotary axle with one of the velocity pulse generators positioned in a 180° rotational difference with respect to the other and generating a corresponding one of first and second velocity pulse signals in synchronization with a revolution of the plate; a first couple of angular velocity measuring sections that measure an angular velocity of the rotary axle from the corresponding one of first and second velocity pulse signals outputted by the first pair of the velocity pulse generators and outputs first and second angular velocity indicative signals each one indicating the measured angular velocity of the rotary axle independently of the other; a first average angular velocity measuring section that calculates an average value of the first and second angular velocity indicative signals outputted by the first couple of angular velocity measuring sections and outputs a first averaged angular velocity indicative signal indicating the average value of the first and second angular velocity indicative signals; a second pair of velocity pulse generators, each velocity pulse generator of the second pair being disposed around the circumference of the plate on a second virtual line passing through the center of the rotary axle and being inclined at an angle of 180°/m to the first virtual line set when a variation in the angular velocity variation rate indicative signal occurs m-th number of times per revolution of the rotary axle and generating a corresponding one of third and fourth velocity pulse signals in synchronization with the revolution of the plate; a second couple of angular velocity measuring sections that measure the angular velocity of the rotary axle from the corresponding one of third and fourth velocity pulse signals outputted by the second pair of the velocity pulse generators and output third and fourth angular velocity indicative signals each one indicating the measured angular velocity of the rotary axle independently of the other; a second average angular velocity measuring section that calculates an average value of the third and fourth angular velocity indicative signals outputted by the second couple of angular velocity measuring sections and outputs a second averaged angular velocity indicative signal indicating the average value of the third and fourth angular velocity indicative signals; a third average angular velocity measuring section that calculates a further average angular velocity measuring section that calculates a further average value of the first and second averaged velocity indicative signals and outputs a fourth averaged angular velocity indicative signal indicating the fourth average value; and a differentiator that differentiates the further average indicative signal to output the angular velocity variation rate indicative signal.

This summary of the invention does not necessarily describe all necessary features so that the invention may also be a sub-combination of these described features.

Figure 1:
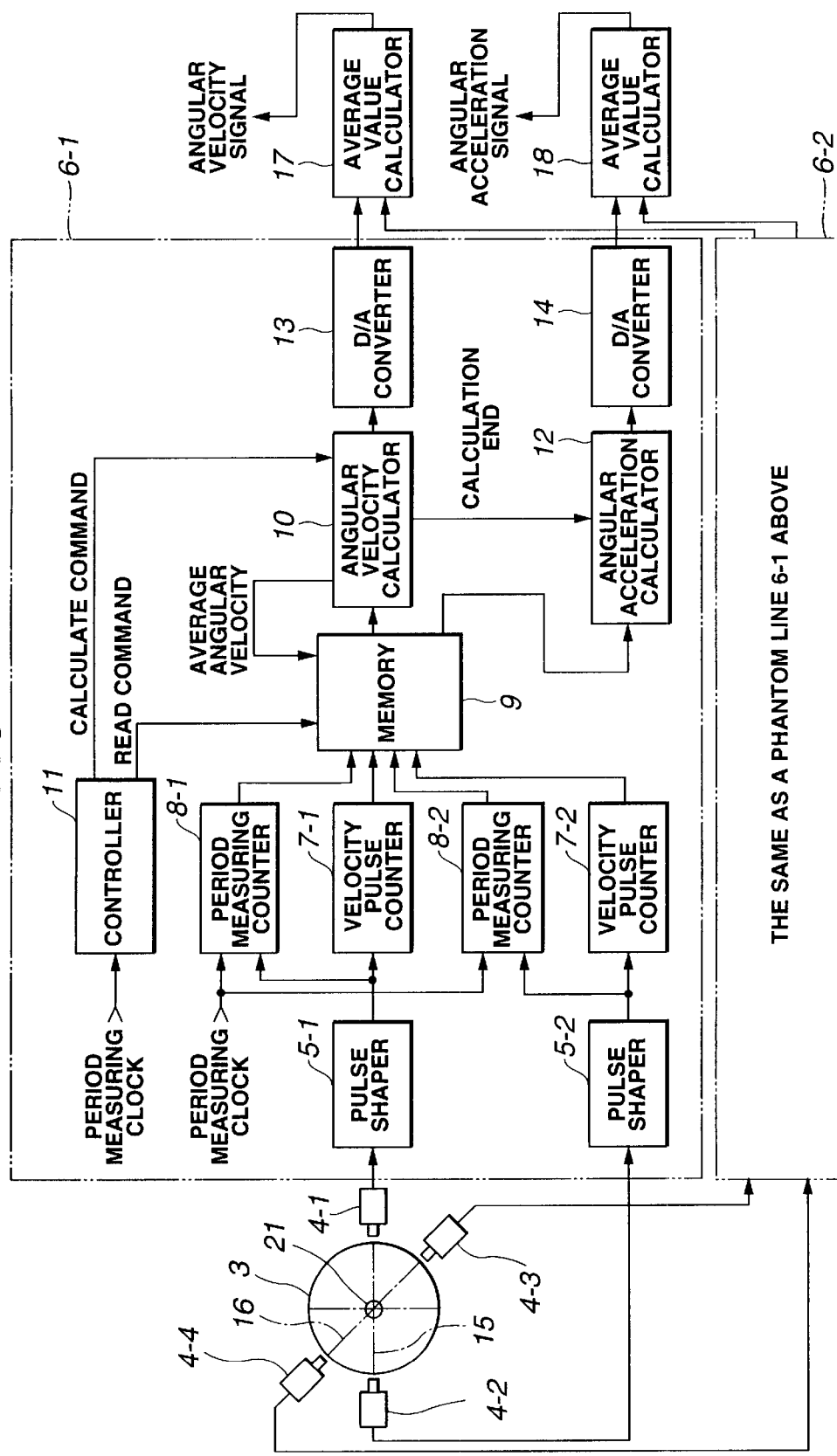
FIG. 1 is a schematic circuit block diagram of an angular velocity variation rate measuring apparatus in a first preferred embodiment according to the present invention.

DETAILED DESCRIPTION OF THE PREFERRED EMBODIMENTS:

Reference will hereinafter be made to the drawings listed above to facilitate a better understanding of the present invention.

Before explaining a first preferred embodiment of an angular velocity variation rate measuring apparatus according to the present invention, function and operation of the previously proposed digital angular velocity variation rate measuring apparatus described above as "related art" will, in order to enhance an understanding of the invention, be described in even more detail below.

When the angular velocity variation rate is calculated, the accumulated number of clock pulses and the average angular velocity which have been previously determined before the n number of measurements are made, are used to improve the resolution of the angular velocity variation rate calculation as much as possible. The number of times n the measurements are made can be set for both the response time in the angular velocity variation rate and a variation rate of the angular velocity variation rate to be optimized. If the resolution is still insufficient, a second memory is used to store the angular velocity rate several times and to output an average result.

For example, since, in the example of the chassis dynamometer described above, eight seconds is a maximum angular velocity variation rate from a zero angular velocity up to the rated angular velocity to accelerate the rotary axle (the roller). Even if the resolution of the angular velocity varied per one second, viz., the angular velocity variation rate is 1/4.000 to the maximum velocity variation rate. If the angular velocity variation rate is measured at the period of 10 milliseconds, the resolution indicates 1/40 the maximum velocity variation rate and means for shortening the measurement period is needed.

In order to achieve a high-speed measurement, each counter is provided with a carry flag and is not reset whenever the measurement period is passed and the carry flag is reset when the carry flag is used. In addition, the memory is installed to secure the measurement calculation sequence when the frequency of the period measuring clock is increased in order to provide a high angular velocity measurement resolution.

If the revolution velocity of the rotary axle is low, even one velocity pulse is not inputted to each other. Each counter, at this time, continues the counting until the subsequent velocity pulse is inputted to each counter. The memory repeats the write operation of the accumulated numbers of velocity pulses and clock pulses thereinto until the subsequent velocity pulses is inputted. Hence, the angular velocity calculating block does not change during this write operation.

When the subsequent velocity pulse is inputted, the angular velocity is calculated using the accumulated values of the velocity pulses and clock pulses which are before the plural number of measurement periods.

If no single number of velocity pulse is inputted within a predetermined period of time, the angular velocity is assumed to be zero.

It is noted that after the data of the velocity pulse counters are stored into the memory, the measured values of the velocity pulse counter pair are reset so that the carry flags for the respective velocity pulse counter pair may not be used.

The calculation of the angular velocity ω(i) (rad/s) in the angular velocity calculating block is carried out in accordance with an equation (1). Actually, in addition to the unit (radian/second), the roller peripheral velocity (m/s) which is the multiplication of (radian/sec) by the roller radius (m) and another unit of Km/s which is the multiplication of (radian/second) by 3.6 are adopted.

$$\omega(i)=(2\rho/Z)\times F\times\{\Sigma P(i)-\Sigma P(i-1)\}/\{\Sigma T(i)-\Sigma T(i-1)\} \quad (1)$$

In the equation (1), ω(i) denotes an average angular velocity measured value at an i-th number of times (radian/second), ΣP(i) denotes the accumulated number of velocity pulses at the i-th number of times (a sum or average of two couples of data), ΣT(i) denotes the accumulated number of clock pulses for the period measurement at the i-th number of times, Z denotes the number of velocity pulses per revolution of the rotary axle, and F denotes the frequency of clock pulses for the period measurement.

Then, the measured value α(i) of the angular velocity variation rate at the i-th number of times (radian/s$^2$) is calculated in accordance with an equation (2).

The unit of the angular velocity variation rate may be a roller peripheral velocity variation rate (m/s$^2$) which is a multiplication of (radian/s$^2$) by the roller radius (m).

$$\alpha(i)=F\times\{\omega(i)-\omega(i-n)\}/\{\Sigma T(i)-\Sigma T(i-n)\} \quad (2).$$

Next, FIG. 1 shows a digital angular velocity variation rate measuring apparatus in a first preferred embodiment according to the present invention.

As shown in FIG. 1, an inductor 3 of a toothed gear type is attached concentrically about a rotary axle. A pair of first velocity pulse generators 4-1 and 4-2 are disposed adjacent to an outer periphery of the inductor 3 on a first virtual center line 15 passing through a center of the rotary axle so as to be diametrically opposed to one another. That is to say, arranged with a mechanical phase or rotational difference of 180° to each other in the same manner as in the previously proposed digital angular velocity variation rate measuring apparatus.

If the number of variations in an angular velocity variation rate signal (velocity variation rate signal) per revolution of the rotary axle is m-th number of times, another pair of second velocity pulse generators 4-3 and 4-4 having the same structures as the pair of first velocity pulse generators 4-1 and 4-2 are disposed adjacent to the outer periphery of the inductor 3 on a second virtual center line 16 passing through the center of the rotary axle and tilted through an angle corresponding to 180°/m with respect to the first center line 15 with one of the second velocity pulse generator pair opposed to the other via the second center line 16 at the phase or rotational difference of 180°. Each output signal of the second velocity pulse generator pair 4-3 and 4-4 is inputted to first and second angular velocity variation rate calculating blocks 6-1 and 6-2, one having the same structure as the other. Each output signal from the corresponding one of the first and second angular velocity variation rate calculating blocks 6-1 and 6-2, viz., each output signal from a corresponding digital-to-analog (D/A) converter 13 and from that in the second block 6-2 is supplied to an average value calculator 17 and each output signal from a corresponding D/A converter 14 and from that in the second block 6-2 is supplied to an average value calculator 18.

Each of the angular velocity variation rate calculating block 6-1 and 6-2 includes: the pulse shaper 5-1 connected to one of the first velocity pulse generator pair 4-1 or 4-2 for shaping the velocity pulse train signal from the corresponding one of the first velocity pulse generator pair 4-1 or 4-2; the pulse shaper 5-2 connected to the other of the second velocity pulse generator pair 4-1 or 4-2 for shaping the velocity pulse train signal from the other of the first velocity pulse generator pair 4-1 or 4-2; the pair of period measuring counters 8-1 and 8-2 each for counting the number of clock pulses upon receipt of the shaped velocity pulse train signal from the corresponding one of the pulse shaper 4-1 or 4-2 and the clock pulse train signal; the pair of velocity pulse counters 7-1 and 7-2 each for counting the received number of the shaped velocity pulse train signals from the corresponding one of the pulse shapers 5-1 or 5-2; a memory 9 receiving the results of measurements by means of the pair of velocity pulse counters 7-1 and 7-2 and by means of the pair of period measuring counters 8-1 and 8-2 by a predetermined number of times; the angular velocity calculator 10 for calculating the angular velocity from the output of the memory 9; the angular acceleration calculator 12 for calculating the angular velocity variation rate; and the pair of D/A converters 13 and 14, each D/A converter connected to the corresponding one of the angular velocity calculator 11 and the corresponding one of the angular velocity variation rate (acceleration) calculator 12. The output analog signal from the corresponding one of the D/A converter pair 13 is supplied to an average value calculator 17 and the signal from the corresponding one of the D/A converter pair is supplied to another average value calculator 18.

It is noted that although the output velocity pulse signals from the other pulse generator pair 4-3 and 4-4 are supplied to the other angular velocity variation rate calculating block 6-2, the explanation of circuit functions in the other angular velocity variation calculating block 6-2 will be omitted herein since the circuit structure is generally the same as the one angular velocity calculating block 6-1.

It is also noted that although the controller 11 is installed within each of the two angular velocity variation rate calculating blocks 6-1 and 6-2, a single controller may be used for the respective angular velocity variation rate calculating blocks 6-1 and 6-2.

It is also noted that the angular velocity calculator 10 calculates the angular velocity in accordance with the equation (1) described above and the angular velocity variation rate calculator 12 calculates the angular velocity variation rate in accordance with the equation (2) described above.

In this embodiment, each of the first and second velocity pulse generator pairs 4-1, 4-2, 4-3, and 4-4 generates the velocity pulse train signal in synchronization with the revolution of the inductor 3. Each velocity pulse train signal is supplied to the corresponding one of the angular velocity variation calculating blocks 6-1 and 6-2 to calculate the angular velocity and the angular velocity variation rate. Each of the calculated angular velocity signals is supplied to the average value calculator 17 to derive an averaged angular velocity which is outputted as the angular velocity signal. Each of the calculated angular velocity variation rate is supplied to the average value calculator 18 to derive an averaged angular velocity variation rate which is outputted as the angular velocity variation rate signal.

Figure 2:
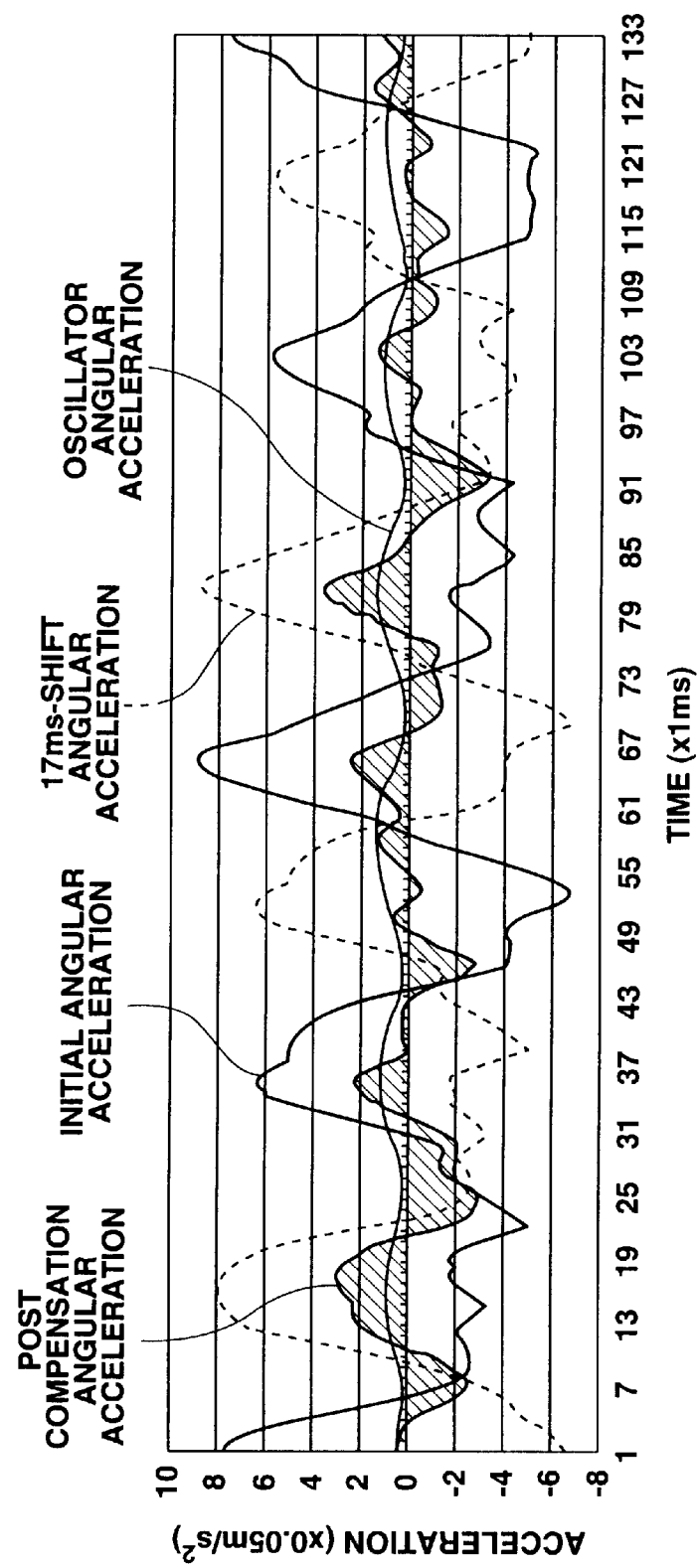
FIG. 2 is an operational waveform chart for explaining respective waveforms outputted from essential circuit blocks shown in FIG. 1.

FIG. 2 shows an operational waveform chart for explaining a result of operation in the first embodiment of the angular velocity variation rate measuring apparatus shown in FIG. 1.

It is noted that FIG. 2 shows data to which a moving average processing of before and after 2 mS interval of time per 1 mS is carried out (the processing time interval is 5 mS) This is done since it is difficult to grasp the phenomenon from the directly derived data.

The initial angular acceleration shown in FIG. 2 indicates the output of the digital-to-analog converter 14 of the first angular velocity variation rate calculating block 6-1. The 17-ms shift angular acceleration shown in FIG. 2 indicates the output of the D/A converter 14 of the second angular velocity variation calculating block 6-2.

That is to say, since the output variation of the angular velocity variation rate m=4 per revolution of the rotary axle, the second velocity pulse generator pair 4-3 and 4-4 are disposed with a mechanical phase shift of 180°/4 =45 with respect to the first velocity pulse generator pair 4-1 and 4-2. Hence, the output signal of the second angular velocity acceleration calculating block 6-2, viz., the output signal of the D/A converter 14 is shifted in time for a time duration during which a 45-degree angular displacement of the rotary axle occurs from the output timing of the D/A converter 14 of the first angular velocity variation rate calculating block 6-1.

Since one period per revolution is 137 mS, the time interval corresponding to 45-degree angular displacement is 1/8×137 mS=17 mS.

A post-compensation angular velocity variation rate signal indicates the output signal of the average value calculating block 18. As shown in the post-compensation angular acceleration signal of FIG. 2, the output variation of the angular velocity variation rate due to the pitch error is remarkably suppressed. To facilitate a grasp in a quantitative analysis, each RMS (Root Mean Square) is secured. Whereas, the RMS of the post-compensation angular velocity is improved to about 38%.

It is noted that the angular acceleration of an oscillator is shown in FIG. 2 for reference purposes.

The output variation of the angular velocity variation rate signal due to the inherently present eccentricity of the inductor 3 with respect to the center of the rotary axle and due to the pitch error can be cancelled by disposing one of two pairs of first and second pulse generators 4-1, 4-2, 4-3, and 4-4 in the 180°/m phase (viz., rotational) difference (m=4 in this embodiment) with the other pair thereof.

Figure 5A:
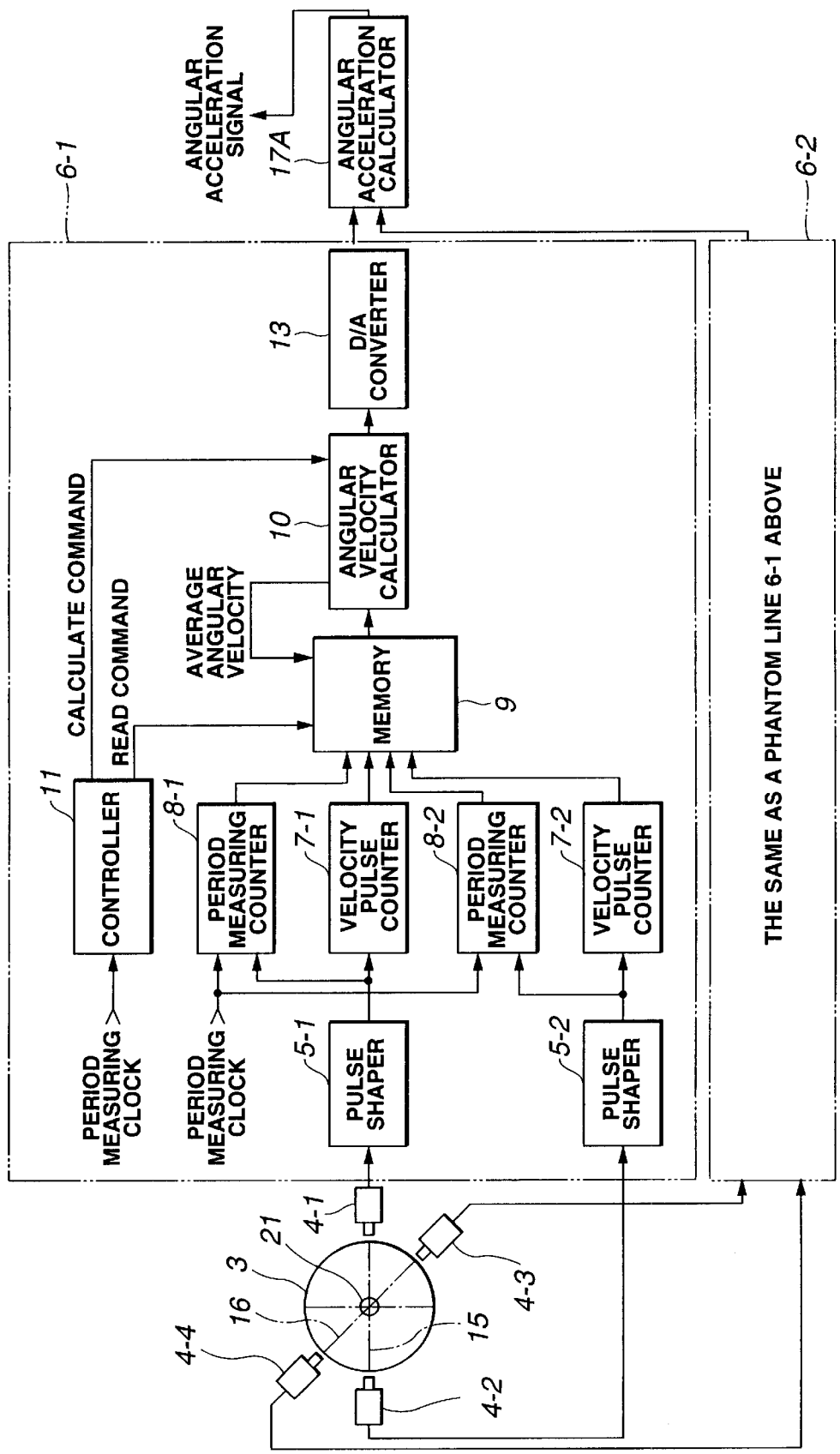
FIG. 5A is a schematic circuit block diagram of the angular velocity variation rate measuring apparatus in a second preferred embodiment according to the present invention.

FIG. 5A shows a second preferred embodiment of the angular velocity variation rate measuring apparatus according to the present invention.

In the first embodiment, in each of the first and second angular acceleration calculating blocks 6-1 and 6-2, the angular velocity variation rate is calculated by each of the angular velocity variation rate calculators 12 from the respective averaged angular velocities of the corresponding angular velocity calculators 10. In the second embodiment, the angular velocity variation rate is calculated from an average of the output signal of each of the angular velocity calculating blocks 10. In the second embodiment, the pair of angular velocity variation rate calculators 12 and 12, the pair of the digital-to-analog converters 14 and 14, and the average value calculator 18 can be omitted.

In FIG. 5A, an angular acceleration calculator 17A calculates the angular velocity variation rate from the respective averaged angular velocities outputted by the angular velocity calculators 10 in each block 6-1 and 6-2.

Figure 3:
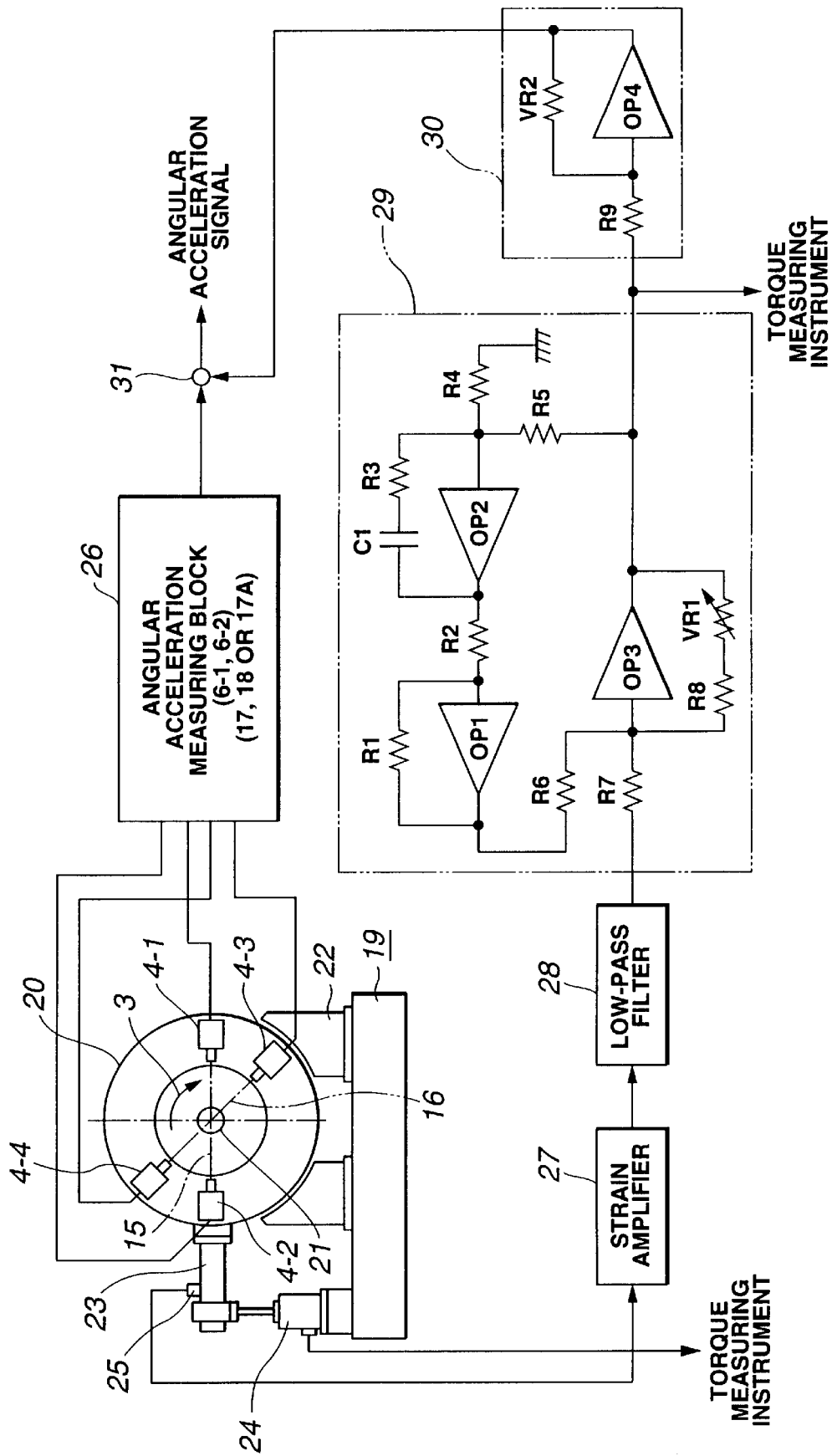
FIG. 3 is a schematic circuit block diagram of a third preferred embodiment of the angular velocity variation rate measuring apparatus according to the present invention.

Next, FIG. 3 shows a third preferred embodiment of the angular velocity variation rate measuring apparatus according to the present invention.

That is to say, FIG. 3 shows a full electric inertia control chassis dynamometer having two rollers of diameters of 1219.2 mm attached onto the rotary axle of a fluid floating type fluctuating dynamometer to which the angular velocity variation rate measuring apparatus is applicable.

A reference numeral 19 in FIG. 3 denotes an oscillation-type dynamometer. A reference numeral 20 denotes its oscillator. The oscillator 20 rotatably supports the rotary axle 21 and is hydraulically supported so as to float and enabled adjustment by means of a hydraulic adjustment portion 22. Each of the two pairs of velocity pulse generators 4-1, 4-2, 4-3, and 4-4 are attached onto the oscillator 20 and arranged face the inductor 3 with mechanical rotational difference of 180° as described in the first embodiment.

A torque arm 23 is projected from the oscillator 20. A tip of the torque arm 23 is linked with a load cell 24 attached onto a fixing portion. The load cell 24 measures the torque. A reference numeral 25 denotes a linear acceleration detector (so-called, G sensor) of a strain gage type attached onto the torque arm. The torque arm 23, the load cell 24, and other torque detecting elements are disclosed in a U.S. Pat. No. 4,989,458 issued on Feb. 5, 1991, the disclosure of which is herein incorporated by reference thereto.

A reference numeral 26 denotes an angular velocity variation measuring block including respective angular velocity variation rate calculating blocks 6-1 and 6-2 as shown in FIG. 1 or FIG. 5A and the average value calculators 17 and 18 as shown in FIG. 5A. The angular velocity variation rate measuring block 26 outputs the angular velocity variation rate signal.

A reference numeral 27 denotes a strain amplifier which amplifies an output of the linearity acceleration sensor 25. A low-pass filter 28 is provided to eliminate high frequency signal components along with a mechanical vibration exceeding a natural vibration frequency found in a revolution direction resonance phenomenon which would occur due to the revolution inertia of the oscillator 20 and due to the elasticity of the load cell 24. A reference numeral 29 denotes DC signal component eliminating circuit to eliminate DC signal component or frequency components in proximity to the DC signal. A reference numeral 30 denotes a coefficient amplifier to convert a physical quantity of the output of the DC signal component eliminating circuit 29. A reference numeral 31 denotes an adder (normally also-called, a subtractor) to subtract the output of the coefficient amplifier 30 from the output of the angular velocity variation rate measuring block 26.

In FIG. 3, the DC signal elimination circuit 29 includes: a first operational amplifier OP1; a first resistor R1 connected across the first operational amplifier OP1; a second operational amplifier OP2 connected to the first operational amplifier OP1 via a second resistor R2; a first capacitor C1 and a serially-connected third resistor R3, both connected across the second operational amplifier OP2; a fourth resistor R4 connected between the second operational amplifier OP2 and the ground; a fifth resistor R5; a third operational amplifier OP3 whose output end is connected to the fifth resistor R5 and whose input end is connected to the first operational amplifier OP1 via a sixth resistor R6; a seventh resistor R7 connected between the low-pass filter (LPF) 28 and the third operational amplifier OP3; and an eighth resistor R8 and a serially connected first variable resistor VR1, both connected across the third operational amplifier OP3. The detailed function of the DC signal component elimination circuit is also exemplified by the U.S. Pat. No. 4,989,458, the disclosure of which is herein incorporated by reference.

The coefficient amplifier 30 includes: a ninth resistor R9; a fourth operational amplifier OP4 whose input end is connected to the DC signal component elimination circuit via the ninth resistor R9 and whose output end is connected to the adder 31; and a second variable resistor VR2 connected across the fourth operational amplifier OP4.

Next, an operation of the apparatus shown in FIG. 3 will be described.

In each of the first and second embodiments, the output variations in the angular velocity signal and the angular velocity variation rate signal due to the presence of the eccentricity of the inductor 3 to the rotary axle 21 and due to the presence of the pitch error in the toothed gear portion of the inductor 3.

If the angular velocity variation rate measuring apparatus according to the present invention is applied to the oscillation-type dynamometer, the oscillator 20 is revolved and oscillated minutely with the rotary axle 21 as a center. It was determined that this minute oscillation gave undesired fluctuations on the angular velocity variation rate signal.

Therefore, it was determined that it becomes necessary to eliminate the influence of the fluctuation found in the oscillator 20.

The linearity acceleration detector 25 detects a mechanical vibration around the rotary axle 21 of the oscillator 20.

The mechanical vibration is amplified by means of the strain amplifier 27. The low-pass filter 28 eliminates the high frequency signal components on the mechanical vibration equal to or more than the natural frequency. The DC signal component elimination circuit 29 picks up only a main frequency signal component of the mechanical vibration. The coefficient amplifier 30 converts the mechanical vibration of only the main frequency signal component into the angular velocity variation rate of the oscillator 20.

Since the first and second pairs of velocity pulse generators 4-1, 4-2, 4-3, and 4-4 are attached onto the oscillator 20, the angular velocity variation rate signal outputted from the average value calculator 18 or the average angular variation rate calculator 17A receives the influence of the variation of the oscillator 20. Hence, since the adder 31 subtracts the output signal of the coefficient amplifier 30 from the output signal of the average value calculator 18 (or the average angular velocity variation rate calculator 17A) to eliminate the influence of the variation in the angular velocity variation rate found in the oscillator 20.

Since the oscillation type dynamometer 19 generates a torque variation having an input frequency component and its sixth times (more accurately, fifth order and seventh order frequency components) although it is slight, the variation in the angular velocity variation rate of the oscillator 20 becomes large in a range of the angular velocity where these vibration frequencies are rendered coincident with the natural frequency. The vibration frequencies are varied about ±20% the natural vibration frequency according to the angular velocity of the rotary axle 21. The velocity range is widened with respect to the influence of the natural frequency. Hence, an effect of correction based on the output signal of the linearity acceleration detection 25 permits it effective range to be accordingly widened.

Figure 4:
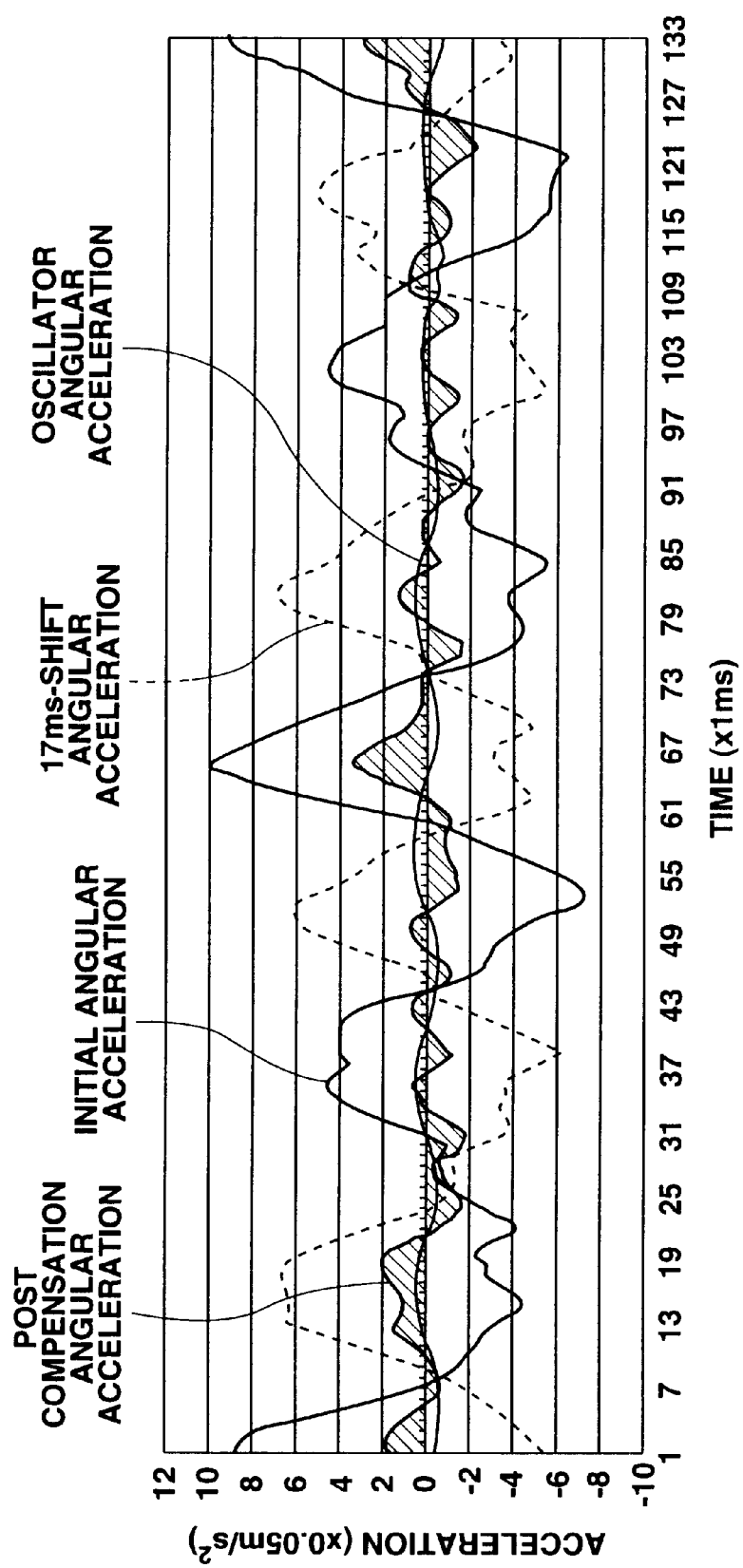
FIG. 4 is an operational waveform chart for explaining an operation of the angular velocity variation rate measuring apparatus shown in FIG. 3.

FIG. 4 shows an operational waveform chart of the apparatus applied to the oscillating type dynamometer shown in FIG. 3.

In FIG. 4, the initial angular acceleration waveform is indicated which is the subtraction of the output signal of the output signal of the coefficient amplifier 30 from the output signal of the coefficient amplifier 30 from the output signal of the D/A converter 14 in the second angular velocity variation rate calculating block 6-1 which receives the moving average processing therefrom, the 17 ms-shift angular acceleration signal waveform is indicated which is the subtraction of the output signal of the coefficient amplifier 30 from the output signal of the D/A converter 14 of the second angular velocity acceleration calculating block 6-2 which receives the moving average processing, and the post-compensation angular velocity acceleration signal is indicated which is the average between the initial angular acceleration signal and the 17 ms-shift angular acceleration signal. A root mean square of the post-compensation angular variation rate (angular acceleration) indicates 0.059 m/s$^2$. Since the initial RMS is approximately 0.202 m/s$^2$, the output variations are reduced up to 29%.

Although the effect of the compensation using the angular velocity variation rate of the oscillator 20 appears small, it effects the variations in the angular velocity variation rate in a velocity range which is lower than the angular velocity under which the result of simulation is carried out as shown in FIG. 3. Thus, at an initial stage of drive of the dynamometer, the magnitudes of these variations in the angular acceleration while being small in difference, the compensation in the angular acceleration causes RMS to be improved up to 0.05 m/s$^2$.

As described in the second embodiment, in the case where the third angular variation rate calculator 17A calculates the angular velocity variation rate, the adder 31 subtracts the output signal of the coefficient amplifier 30 from the output signal of the third variation rate calculator 17A.

Figure 5B:
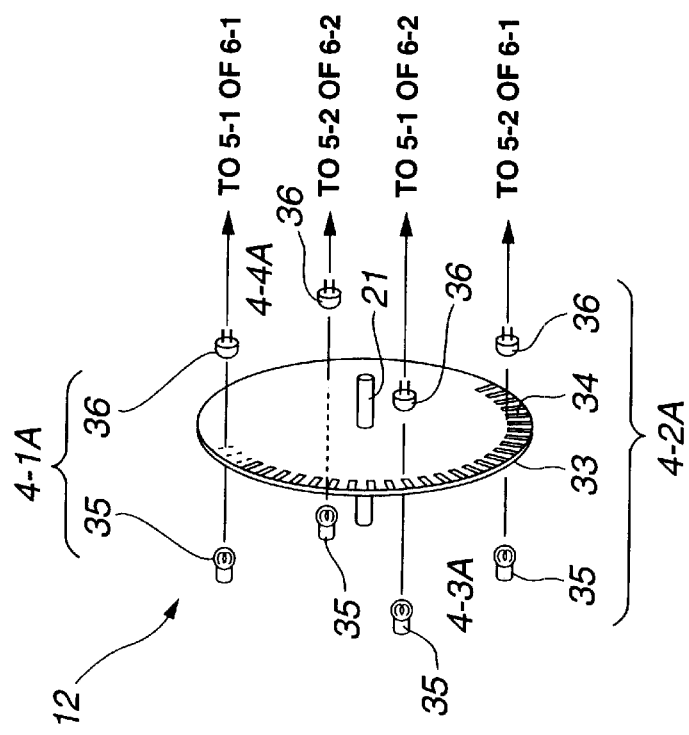
FIG. 5B is a partial circuit block diagram of the torque measuring apparatus for explaining an alternative to the angular velocity variation rate measuring apparatus shown in FIG. 3.

FIG. 5B shows an alternative of the third embodiment shown in FIG. 3.

In a case wherein a rotation direction of the oscillating type electric dynometer is reversible, a polarity switching device 30A is interposed between the coefficient amplifier 30 shown in FIG. 3 and the adder 31 to change a polarity of the output signal of the coefficient amplifier 30 in accordance with the rotation direction of the dynamometer.

Figure 5C:
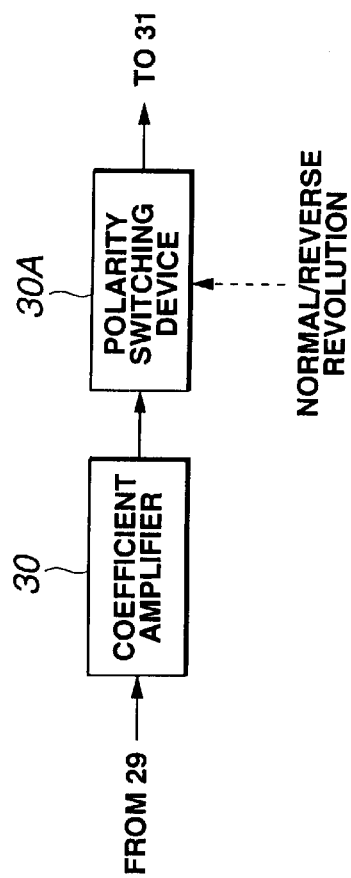
FIG. 5C is a schematic explanatory view of an arrangement of both pairs of velocity pulse generators of an optical rotary encoder type

Although, in each embodiment, the case where the inductor 3 of the toothed gear type is concentrically attached onto the rotary axle 21 has been described, the present invention is applicable to the case wherein the optical slit plate on the outer peripheral end of which the plurality of slits 33 and 34 are provided at mutually equal distances with respect to the first and second pairs of the photo couplers 4-1A, 4-2A, 4-3A, and 4-4A, and wherein each photo coupler has a light emitting diode 35 and a photo sensor 36, with the same tilted angle as described in the case of the inductor 3 of the toothed gear type are attached above the slip portion of the slit plate, as shown in FIG. 5C.

The entire contents of a Japanese Patent Application No. Heisei 11-50933 (filed in Japan on Feb. 26, 1999) are herein incorporated by reference. Although the invention has been described above by reference to a limited number of embodiments of the invention, the invention is not limited to the embodiments described above. Modifications and variations of the embodiments described above will be selfevident to those skilled in the art in the light of the above teachings. The scope of the invention is defined with reference to the following claims.

What is claimed is:

1. An apparatus for measuring an angular velocity variation rate of a rotary axle, comprising:

an approximately circular disc shaped plate attached approximately concentrically around the rotary axle, the approximately circular disc shaped plate including a plurality of approximately equally spaced apart projections on a circumference thereof;

a first pair of velocity pulse generators, each velocity pulse generator of the first pair being disposed around the circumference of the plate on a first virtual line passing through a center of the rotary axle with one of the velocity pulse generators positioned in an 180° revolution difference with respect to the other and generating a corresponding one of first and second velocity pulse signals in synchronization with a revolution of the plate;

a first couple of angular velocity measuring sections that measure an angular velocity of the rotary axle from the corresponding one of first and second velocity pulse signals outputted by the first pair of the velocity pulse generators and outputs first and second angular velocity indicative signals each one indicating the measured angular velocity of the rotary axle independently of the other;

a first average angular velocity measuring section that calculates an average value of the first and second angular velocity indicative signals outputted by the first couple of angular velocity measuring sections and outputs a first averaged angular velocity indicative signal indicating the average value of the first and second angular velocity indicative signals;

a second pair of velocity pulse generators, each velocity pulse generator of the second pair being disposed around the circumference of the plate on a second virtual line passing through the center of the rotary axle and being inclined with respect to the first virtual line at an angle of 180°/m, wherein m denotes a number of times per revolution of the rotary axle that a variation of an angular velocity variation rate indicative signal occurs, and being set when the variation in the angular velocity variation rate indicative signal occurs m-the number of times per revolution of the rotary axle, and generating a corresponding one of third and fourth velocity pulse signals in synchronization with the revolution of the plate;

a second couple of angular velocity measuring sections that measure the angular velocity of the rotary axle from the corresponding one of third and fourth velocity pulse signals outputted by the second pair of the velocity pulse generators and output third and fourth angular velocity indicative signals each one indicating the measured angular velocity of the rotary axle independently of the other;

a second average angular velocity measuring section that calculates an average value of the third and fourth angular velocity indicative signals outputted by the second couple of angular velocity measuring sections and outputs a second averaged angular velocity indicative signal indicating the average value of the third and fourth angular velocity indicative signals; and a differentiating section that differentiates a signal based on at least one of the first and second averaged angular velocity indicative signals outputted by the first and second average angular velocity measuring sections to output the angular velocity variation rate indicative signal.

2. An apparatus for measuring an angular velocity variation rate of a rotary axle as claimed in claim 1, wherein the differentiating section includes: a first differentiator that differentiates the first averaged velocity indicative signal to output a first angular velocity variation rate indicative signal; and a second differentiator that differentiates the second averaged velocity indicative signal to output a second velocity variation rate indicative signal, and further comprising an average value calculator that calculates an average value of the first and second averaged angular velocity variation rate indicative signals to output the angular velocity variation rate indicative signal.

3. An apparatus for measuring an angular velocity variation rate of a rotary axle as claimed in claim 1, further comprising: a third average angular velocity measuring section that calculates a further average value of the first and second averaged velocity indicative signals and outputs a fourth averaged angular velocity indicative signal indicating the fourth average value and wherein the differentiating section differentiates the further average indicative signal to output the angular velocity variation rate indicative signal.

4. An apparatus for measuring an angular velocity variation rate of a rotary axle as claimed in claim 2, wherein the rotary axle is a rotary axle of an oscillating type dynamometer and the first and second velocity pulse generator pairs are attached onto an oscillator of the oscillating type dynamometer and further comprising: a linearity acceleration sensor to detect a revolution vibration with the rotary axle of the oscillator as a center; DC signal component eliminating circuit to eliminate DC signal component included in an output signal of the linearity acceleration sensor; a coefficient amplifier to convert an output signal of the DC signal component eliminating circuit into another angular velocity variation rate signal; and a subtractor to subtract an output signal of the coefficient amplifier from the angular velocity variation rate indicative signal outputted from the average value calculator so that an oscillator revolution angle acceleration component included in the angular velocity variation rate indicative signal outputted by the average value calculator is cancelled.

5. An apparatus for measuring an angular velocity variation rate of a rotary axle as claimed in claim 3, wherein the rotary axle is a rotary axle of an oscillating type dynamometer and the first and second velocity pulse generator pairs are attached onto an oscillator of the oscillating type dynamometer and further comprising: a linearity acceleration sensor to detect a revolution vibration with the rotary axle of the oscillator as a center; DC signal component eliminating circuit to eliminate DC signal component included in an output signal of the linearity acceleration sensor; a coefficient amplifier to convert an output signal of the DC signal component eliminating circuit into another angular velocity variation rate signal; and a subtractor to subtract an output signal of the coefficient amplifier from the angular velocity variation rate indicative signal outputted by the differentiating section so that an oscillator revolution angle velocity variation rate component included in the angular velocity variation rate indicative signal outputted by the differentiating section is cancelled.

6. An apparatus for measuring an angular velocity variation rate of a rotary axle as claimed in claim 5, further comprising: a polarity switching device to change a polarity of the output signal of the coefficient amplifier in accordance with direction of the revolution of the dynamometer.

7. An apparatus for measuring an angular velocity variation rate of a rotary axle as claimed in claim 2, wherein the first couple of the angular velocity measuring sections include: a first pair of pulse shapers, each pulse shaper connected to the corresponding one of the first and second velocity pulse generators of the first pair to shape the corresponding one of the first and second velocity pulse signals; a first pair of velocity pulse counters, each pulse counter of the first pair counting a number of pulses in an output signal of the corresponding one of the pulse shapers of the first pair and having a first output register to accumulatively store the counted number of pulses in the output signal of the corresponding one of the pulse shapers of the first pair; a first pair of period measuring counters, each period measuring counter of the first pair receiving and counting the number of pulses in period measuring clock pulses, counting the number of pulses in the period measuring clock pulses, and having a second output register to accumulatively store the counted number of pulses in the period measuring clock pulses; a first memory to store and update the counted number of pulses from the first output register of the corresponding one of the velocity pulse counters of the first pair for each of the measurement period clock pulses by a predetermined number of times, each counted number of pulses being the corresponding one of the first and second angular velocity indicative signals.

8. An apparatus for measuring an angular velocity variation rate of a rotary axle as claimed in claim 7, wherein the second couple of the angular velocity measuring sections include: a second pair of pulse shapers, each pulse shaper connected to the corresponding one of the first and second velocity pulse generators of the second pair to shape the corresponding one of the third and fourth velocity pulse signals; a second pair of velocity pulse counters, each pulse counter of the second pair counting the number of pulses in an output signal of the corresponding one of the pulse shapers of the second pair and having a third output register to accumulatively store the counted number of pulses in the output signal of the corresponding one of the pulse shapers of the second pair; a second pair of period measuring counters, each period measuring counter of the second pair receiving and counting the number of pulses in the period measuring clock pulses, counting the number of pulses in the period measuring clock pulses, and having a fourth output register to accumulatively store the counted number of pulses in the period measuring clock pulses; a second memory to store and update the counted number of pulses from the second output register of the corresponding one of the velocity pulse counters of the second pair for each of the measurement period clock pulses by the predetermined number of times, each counted number of pulses being the corresponding one of the third and fourth angular velocity indicative signals.

9. An apparatus for measuring an angular velocity variation rate of a rotary axle as claimed in claim 8, wherein the first average angular velocity measuring section performs a moving average of the first and second angular velocity indicative signals and outputs the first averaged angular velocity indicative signal and the second average angular velocity measuring section performs the moving average of the third and fourth angular velocity indicative signals and outputs the second averaged angular velocity indicative signal.

10. An apparatus for measuring an angular velocity variation rate of a rotary axle as claimed in claim 9, wherein the approximately circular disc shaped plate is an inductor of a toothed gear type and each of the velocity pulse generators of the first and second pairs is constituted by a magnetic pick-ups.

11. An apparatus for measuring an angular velocity variation rate of a rotary axle as claimed in claim 10, wherein m is four.

12. An apparatus for measuring an angular velocity variation rate of a rotary axle as claimed in claim 9, wherein the approximately circular disc shaped plate is a rotary encoder having a plurality of slits on the circumference thereof and each of the velocity pulse generators of the first and second pair is constituted by a photo coupler and wherein m is either two or six.

13. An apparatus for measuring an angular velocity variation rate of a rotary axle, comprising:

an approximately circular disc shaped plate attached approximately concentrically around the rotary axle, the approximately circular disc shaped plate including a plurality of approximately equally spaced apart projections on a circumference thereof;

a first pair of velocity pulse generators, each velocity pulse generator of the first pair being disposed around the circumference of the plate on a first virtual line passing through a center of the rotary axle with one of the velocity pulse generators positioned in an 180° revolution difference with respect to the other and generating a corresponding one of first and second velocity pulse signals in synchronization with a revolution of the plate;

a first couple of angular velocity measuring sections that measure an angular velocity of the rotary axle from the corresponding one of first and second velocity pulse signals outputted by the first pair of the velocity pulse generators and outputs first and second angular velocity indicative signals each one indicating the measured angular velocity of the rotary axle independently of the other;

a first average angular velocity measuring section that calculates an average value of the first and second angular velocity indicative signals outputted by the first couple of angular velocity measuring sections and outputs a first averaged angular velocity indicative signal indicating the average value of the first and second angular velocity indicative signals;

a second pair of velocity pulse generators, each velocity pulse generator of the second pair being disposed around the circumference of the plate on a second virtual line passing through the center of the rotary axle and being inclined with respect to the first virtual line at an angle of 180°/m, wherein m denotes a number of times per revolution of the rotary axle that a variation rate of an angular velocity variation rate indicative signal occurs, and being set when the variation in the angular velocity variation rate indicative signal occurs m-th number of times per revolution of the rotary axle and generating a corresponding one of third and fourth velocity pulse signals in synchronization with the revolution of the plate;

a second couple of angular velocity measuring sections that measure the angular velocity of the rotary axle from the corresponding one of third and fourth velocity pulse signals outputted by the second pair of the velocity pulse generators and output third and fourth angular velocity indicative signals each one indicating the measured angular velocity of the rotary axle independently of the other;

a second average angular velocity measuring section that calculates an average value of the third and fourth angular velocity indicative signals outputted by the second couple of angular velocity measuring sections and outputs a second averaged angular velocity indicative signal indicating the average value of the third and fourth angular velocity indicative signals;

a first differentiator that differentiates the first averaged velocity indicative signal to output a first angular velocity variation rate indicative signal;

a second differentiator that differentiates the second averaged velocity indicative signal to output a second angular velocity variation rate indicative signal; and an average value calculator that calculates an average value of the first and second averaged angular velocity variation rate indicative signals to output the angular velocity variation rate indicative signal.

14. An apparatus for measuring an angular velocity variation rate of a rotary axle, comprising:

an approximately circular disc shaped plate attached approximately concentrically around the rotary axle, the approximately circular disc shaped plate including a plurality of approximately equally spaced apart projections on a circumference thereof;

a first pair of velocity pulse generators, each velocity pulse generator of the first pair being disposed around the circumference of the plate on a first virtual line passing through a center of the rotary axle with one of the velocity pulse generators positioned in an 180° revolution difference with respect to the other and generating a corresponding one of first and second velocity pulse signals in synchronization with a revolution of the plate;

a first couple of angular velocity measuring sections that measure an angular velocity of the rotary axle from the corresponding one of first and second velocity pulse signals outputted by the first pair of the velocity pulse generators and outputs first and second angular velocity indicative signals each one indicating the measured angular velocity of the rotary axle independently of the other;

a first average angular velocity measuring section that calculates an average value of the first and second angular velocity indicative signals outputted by the first couple of angular velocity measuring sections and outputs a first averaged angular velocity indicative signal indicating the average value of the first and second angular velocity indicative signals;

a second pair of velocity pulse generators, each velocity pulse generator of the second pair being disposed around the circumference of the plate on a second virtual line passing through the center of the rotary axle and being inclined with respect to the first virtual line at an angle of 180°/m, wherein m denotes a number of times per revolution of the rotary axle that a variation of an angular velocity variation rate indicative signal occurs, and being set when the variation in the angular velocity variation rate indicative signal occurs m-th number of times per revolution of the rotary axle and generating a corresponding one of third and fourth velocity pulse signals in synchronization with the revolution of the plate;

a second couple of angular velocity measuring sections that measure the angular velocity of the rotary axle from the corresponding one of third and fourth velocity pulse signals outputted by the second pair of the velocity pulse generators and output third and fourth angular velocity indicative signals each one indicating the measured angular velocity of the rotary axle independently of the other;

a second average angular velocity measuring section that calculates an average value of the third and fourth angular velocity indicative signals outputted by the second couple of angular velocity measuring sections and outputs a second averaged angular velocity indicative signal indicating the average value of the third and fourth angular velocity indicative signals;

a third average angular velocity measuring section that calculates a further average angular velocity measuring section that calculates a further average value of the first and second averaged velocity indicative signals and outputs a fourth averaged angular velocity indicative signal indicating the fourth average value; and a differentiator that differentiates the further average indicative signal to output the angular velocity variation rate indicative signal.

* * * * *